United States Patent [19]
Renier

[11] Patent Number: 5,409,049
[45] Date of Patent: Apr. 25, 1995

[54] TANGENTIAL TIRE PRESSURIZING AND REGULATING APPARATUS

[75] Inventor: Grant J. Renier, Allison Park, Pa.

[73] Assignee: Cycloid Company

[21] Appl. No.: 96,663

[22] Filed: Jul. 23, 1993

Related U.S. Application Data

[63] Continuation-in-part of Ser. No. 891,410, May 29, 1992, abandoned.

[51] Int. Cl.⁶ ............................................. B60C 23/12
[52] U.S. Cl. ..................................... 152/418; 384/49; 417/211; 417/233; 92/178
[58] Field of Search ............... 152/415, 418, 419, 420, 152/421, 422; 417/211, 233; 384/49; 92/178, 169.1

[56] References Cited

U.S. PATENT DOCUMENTS

| | | | |
|---|---|---|---|
| 1,643,945 | 10/1927 | Crook | 417/211 |
| 1,887,715 | 11/1932 | Hester | 152/415 |
| 2,055,983 | 9/1936 | Peo | 152/419 |
| 2,161,384 | 6/1939 | Rinfret | 152/415 |
| 3,003,827 | 10/1961 | Hentschke | 384/49 |
| 3,271,087 | 9/1966 | Wieland et al. | 384/49 |
| 3,466,054 | 9/1969 | Berg | 92/178 |
| 3,674,324 | 7/1972 | Schweizer et al. | 384/49 |
| 3,922,037 | 11/1975 | Yamada et al. | 384/49 |
| 4,307,997 | 12/1981 | Richards et al. | 417/211 |

FOREIGN PATENT DOCUMENTS

| | | | |
|---|---|---|---|
| 906319 | 12/1945 | France. | |
| 0148705 | 8/1985 | Japan | B60C 23/16 |
| 467096 | 6/1937 | United Kingdom. | |
| 1032214 | 7/1983 | U.S.S.R. | F04B 31/00 |

*Primary Examiner*—Michael W. Ball
*Assistant Examiner*—Francis J. Lorin
*Attorney, Agent, or Firm*—Carothers & Carothers

[57] ABSTRACT

Apparatus for harnessing and utilizing, inter alia, gravitational and centrifugal forces generated at a location eccentric from the axis of rotation of a rolling wheel. The apparatus includes pumps that can be attached in a tangential relationship to a path of wheel rotation of an automobile wheel in order to pressurize under-inflated tires and maintain tire pressure at a preset value. A double acting unitary piston assembly is supported for antifrictional reciprocation in a pump housing along a line tangential with respect to a path of wheel rotation so that gravitational force will principally displace the piston assembly to effect working strokes for inflating a pneumatic tire. Compression ratio parameters of the pump are preselected to cause the pump to be effective at wheel rotation velocities above which gravitational forces are no longer effective to operate the pump. A device is also provided to adjust the compression ratio of the pump to thereby adjust the air pressure to be maintained in the tire.

18 Claims, 7 Drawing Sheets

TANGENTIAL TIRE PRESSURIZING AND REGULATING APPARATUS

CROSS REFERENCE TO RELATED APPLICATIONS

This application is a continuation-in-part of application Ser. No. 07/891,410, filed May 29, 1992, now abandoned.

This application also relates to a former application by the same inventor, Ser. No. 07/750,606, filed Aug. 27, 1991 entitled "TIRE PRESSURING AND REGULATING APPARATUS", now U.S. Pat. No. 5,201,968 issued Apr. 13, 1993.

BACKGROUND OF THE INVENTION

1. Field of the Invention

The present invention relates generally to apparatus for harnessing and utilizing gravitational forces and, more particularly, as such forces relate to an automatic pneumatic tire pressurizing and regulating apparatus attachable to a vehicle wheel and operated by the rolling motion thereof.

2. Description of the Prior Art

It is believed that there is no known mechanical application of such kinds of apparatuses having a displacement type air pump including an oscillating unitary free piston mass which is antifrictionally supported for reciprocation and principally utilizes gravitational forces produced at location(s) eccentric from an axis of rotation of a body experiencing rolling translation while also utilizing centrifugal forces and minimizing the negative effects thereof. Such forces are created at all points eccentric from the axis of rotation of a rolling vehicle wheel, for example. Hence, an advantage exists for an apparatus for harnessing and utilizing gravitational and centrifugal forces generated at locations eccentric from an axis of rotation of a rolling body, particularly a vehicle wheel or the like, wherein primarily the gravitational forces are used to both position a means for effecting a working stroke and for causing the operation thereof, and wherein centrifugal forces that may be present are positively utilized but not principally relied upon, do not prevent the effective utilization of the gravitational forces. Such an apparatus could be mounted to a vehicle wheel and advantageously used, inter alia, to operate a pump mechanism for pressuring and regulating the pressure of a pneumatic vehicle tire.

It is further believed that no such tire pressurizing and regulating apparatus is available which can be tuned by preselecting compression ratio parameters such as piston mass, piston stroke length, piston face area, piston blow-by, piston shape, piston friction, cylinder volume and intake and output orifice size, whereby the piston may be caused to oscillate to effect working strokes due to gas compression spring effects to respectively initiate piston movement in the opposite direction even at wheel rotation velocities which are in excess of velocities whereby gravity is no longer effective or sufficient to effect working strokes of the piston.

Other wheel mounted apparatuses have been proposed for automatically controlling vehicle tire pressure. An example of such an apparatus is described in U.S. Pat. No. 4,349,064 wherein one or more centrifugally operated dual-chamber piston and cylinder pumps are secured to the rim of a vehicle wheel interiorly of a surrounding pneumatic tire. Upon repeated cycles of acceleration and deceleration of the rotation of the vehicle wheel, centrifugal force causes the piston to pump air into the tire until predetermined tire pressure is achieved where upon the pump then serves to maintain the predetermined pressure. Such a system requires permanent attachment of the pump to the rim of the wheel, modification of the wheel structure, and removal of the tire in order to service or replace the pump.

Similar centrifugally operated pump/regulators are described in U.S. Pat. No. 4,570,691 wherein the regulator is again secured to the wheel rim interiorly of the tire and in U.S. Pat. No. 4,651,792 wherein the pump is secured to the interior of the tire. These pump/regulators suffer from disadvantages similar to those associated with U.S. Pat. No. 4,349,064. Furthermore, all of the aforementioned pump/regulators operate exclusively on the principal of harnessing and utilizing centrifugal force, a force which is not cyclic so that the pump/regulators must employ a design to operate on other variables or introduced forces.

The inflating device described in U.S. Pat. No. 1,643,945 does appear to take advantage of gravitational forces. However, the free floating piston mechanism is not unitary in construction and cannot be realized or even adapted to take advantage of piston gas compression restoring forces in order to make the pump operative even at wheel rotational velocities above the point where working strokes can no longer be effected by gravity alone.

A double action automatic tire inflation pump is illustrated in U.S. Pat. No. 2,055,983. This inflation device is attached essentially to the wheel and cannot take principal advantage of the effects of gravitation and further supports the entire free floating piston mass with sliding frictional engagement between the pistons and piston cylinders. Additionally, no teachings are suggested whereby the inflation device might be tuned in order to make the pump operable even after such time that the pump would normally be absolutely inoperative due to excessive wheel rotational velocities.

U.S. Pat. No. 4,307,997 also illustrates another double action free piston inertia pump. It additionally does not take full advantage of the effects of gravitational forces upon the pump and it does not teach or suggest tuning of the pumping device by taking advantage of gas compression spring effect created by the opposing double action pistons in order to make the device operative even at rotational velocities in excess of those at which the pump will normally not operate, even though this reference does teach the use of a gas spring effect to initiate movement in the opposite direction and to cushion the piston impact.

It is an object of the present invention to provide apparatus for harnessing and utilizing gravitational forces generated at a location eccentric from the axis of rotation of a vehicle wheel for pressurizing and regulating the pressure of a pneumatic tire carried by the wheel, wherein primarily gravitational forces are used to both position a pressure creating means in an operating position and for effecting operation thereof, and wherein the apparatus will not be adversely affected by negative effects of centrifugal forces.

It is a further object of the present invention to provide a readily accessible pneumatic tire pump/regulator which is releasably attachable to an existing wheel rim structure, such as the wheel valve stem universally employed today, and which will be of a very small size and weight, yet capable of producing a relatively high effective pressure.

Another object of the present invention is to provide for a pneumatic tire pump/regulator to be mounted on the wheel vane stem of an inflatable vehicle tire, in which the pump/regulator is tangentially positioned relative to the path of rotation of the tire and stem and capable of providing two pumping strokes per revolution of the wheel.

It is another object of the present invention to provide a double action piston cylinder device attachable to the valve stem of a pneumatic tire, wherein the piston is arranged tangentially to the rotational path of the stem, and wherein the piston will be positioned primarily by gravitational force and some centrifugal force generated by the system in two working stroke positions during a given rotation of the tire, and when so positioned the piston will be displaced primarily by gravity with some positive centrifugal force influence to effect the two working strokes.

It is a farther object of the present invention to provide a pneumatic tire pump/regulator requiring no modification of either the vehicle wheel or the pneumatic tire.

A still further object of the present invention is to provide a pneumatic tire pump/regulator having a piston cylinder assembly, wherein the piston thereof has a central member and two similar axially extending opposed end members, and wherein the central member possesses substantially the greater part of the mass of the piston.

Another object of the present invention is to support the enlarged central piston member of the double action piston assembly itself for antifrictional reciprocation in its housing. This is preferably accomplished with maximum antifrictional capabilities such as by spaced rotatable bearing elements, or less expensively with oil impregnated bronze slide bearings.

Yet another object of the present invention is to provide such a pneumatic tire pump/regulator wherein the compression ratio parameters of the pump (such as piston mass, piston stroke length, piston face area, piston blow by, piston shape, piston friction, cylinder volume, and intake and output orifice size) may be preselected for tuning the pump whereby the double action piston assembly is cause to oscillate to effect working strokes due to the gas compression spring effect of the double acting piston-cylinder arrangements or combinations, to respectively initiate movement in the opposite directions, even at wheel rotation velocities in excess of which gravity can no longer provide sufficient effect or working strokes.

It is a further object to provide a pneumatic tire pump/regulator wherein the tire maintenance pressure is controlled by controlling the compression ratio of the pump.

Still other objects and advantages of the present invention will become more apparent in light of the attached drawings and written description of the invention presented hereinbelow.

SUMMARY OF THE INVENTION

In accordance with the present invention, it is possible to construct a variety of apparatuses, for example pumps, that can be attached, for example, to the valve of an automobile tire or mounted directly internally to the wheel in order to pressurize under-inflated tires and maintain tire pressure at a preset value. The forces involved in operating the pump at nominal speeds, for example 30 miles per hour, are gravitational, centrifugal and other forces, such as acceleration, deceleration and pump friction and compression parameters.

The effective working capability of the pump can also be extended to higher rates of speeds wherein pumps of the prior art would not and cannot be effective. This is accomplished by utilizing the gas compression spring effect of the double acting piston-cylinder assembly or combination which respectively and alternately initiates movement of the piston assembly in opposite directions. This gas spring effect is operable to further effectually operate the pump with working strokes even though the wheel rotation velocities are in excess of those velocities wherein normally the pump would be ineffectual.

This spring effect may be optimized by preselecting one or more of the compression ratio parameters of the pump in its double action configuration prior to manufacture to satisfy specified performance requirement. Such parameters include piston mass, piston stroke length, piston face area, piston blow-by, piston shape, piston friction, cylinder volume, and intake and output orifice size.

The present invention also provides a novel method of adjusting the tire maintenance pressure by correspondingly adjusting the pump compression ratio.

There are two well known and highly sought after major cost benefits when pumps constructed according to the present invention are installed on each of the valve stems of the four wheels of a vehicle, such as an automobile. The maintenance of the correct tire pressure will improve the overall wear of the tires that often suffer from under, over and uneven inflation. In addition, and which is becoming of increased importance from a national energy standpoint, fuel economy may be substantially improved by the decrease of rolling friction of tires on the road surface.

DETAILED DESCRIPTION OF THE PRESENT INVENTION AS RELATED TO A PNEUMATIC TIRE PUMP/REGULATOR

Figure 1:
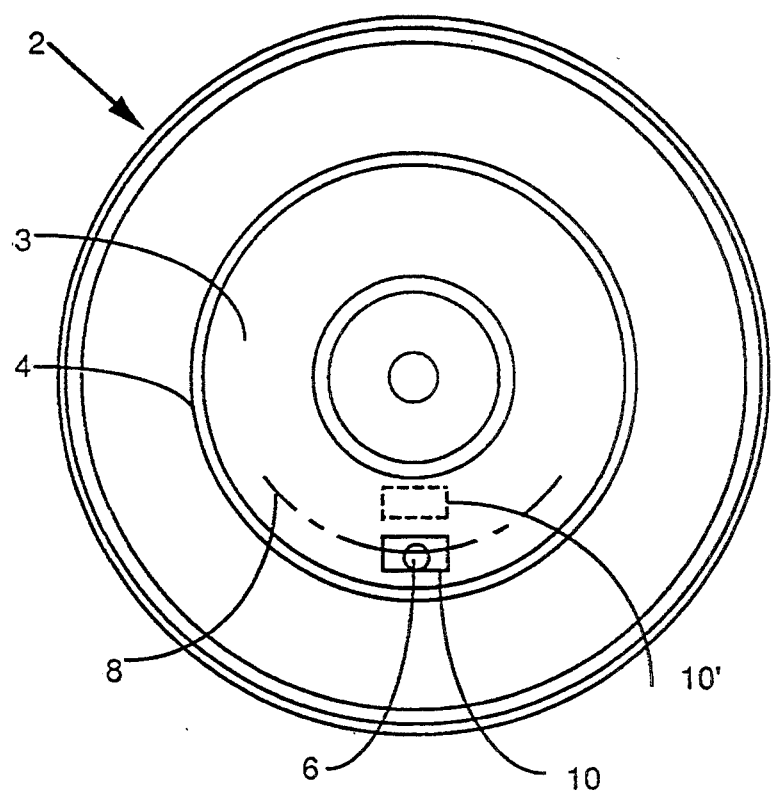
FIG. 1 is a schematic front view of a common and well known tire, wheel and valve stem assembly to which the apparatus of the present invention has been associated in a working position.

In FIG. 1 there is illustrated a typical tire-wheel assembly 2 of a vehicle, not shown, comprising of a wheel 3, a rim 4 and a vane stem 6, for example as used in an automobile, truck or bus. Shown attached to the outer end of the stem 6 is a tire pressurizing and regulating apparatus 10 of the present invention. While the apparatus 10 is shown attached to the end of the stem, it may be mounted on the outside of the wheel itself or in a pocket provided therein inward of the stem, depending on the applicable factors that make up rotational speed of the wheel assembly, such as the speed of the vehicle, wheel size and length of the valve stem. One such inward position is shown in outline form in FIG. 1 at 10', in which the apparatus is intended to be arranged in the same tangential relationship to a radial line passing through the center of the wheel, as viewed in FIG. 1, as the apparatus mounted on the valve stem. The tangent circle or path of wheel rotation for the apparatus 10 is indicated at 8 in FIG. 1. The apparatus may also be mounted on the wheel internally thereof or in a pocket provided therein where it will be exposed directly to the inside of the tire in which the tire will be pressurized without being connected to a valve stem.

Figure 2:
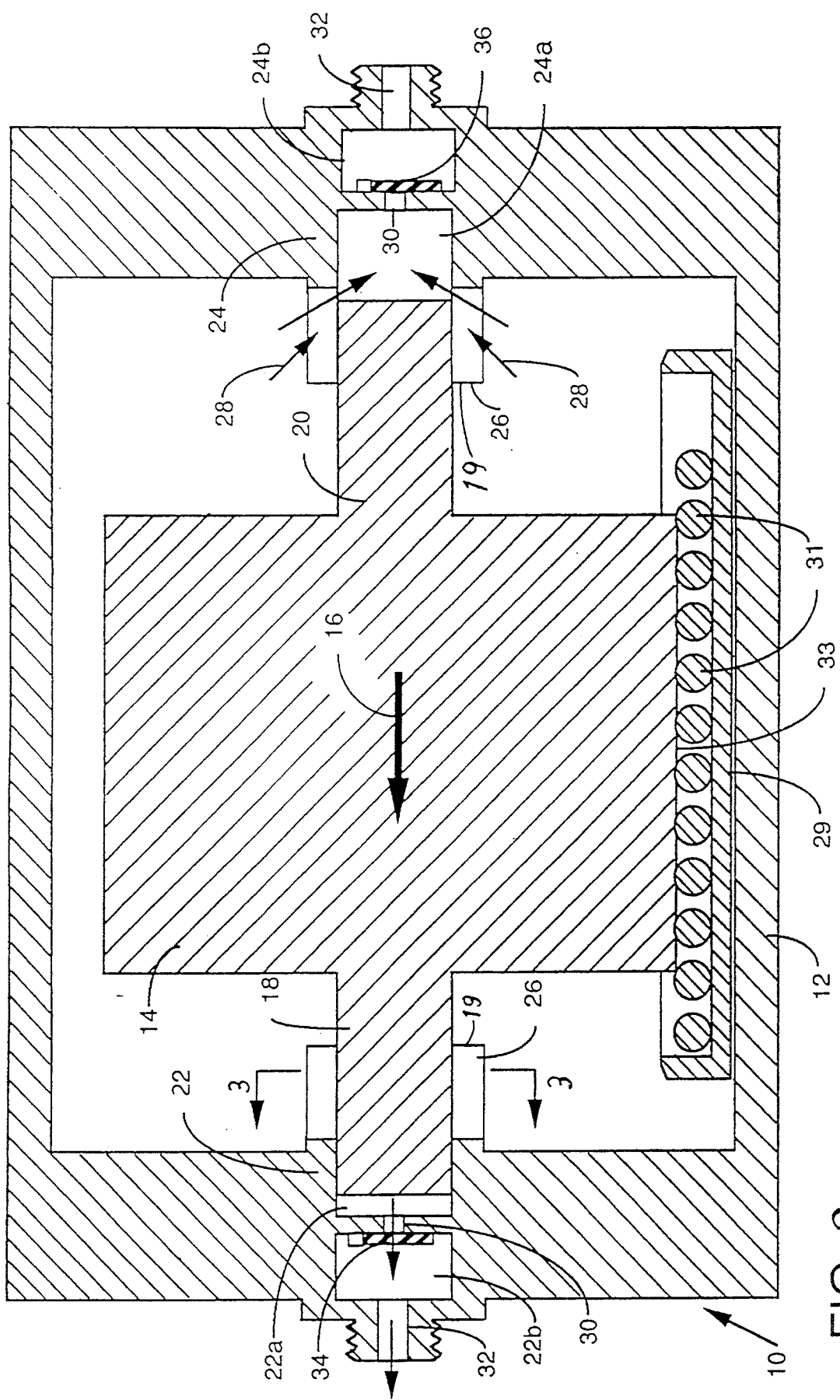
FIG. 2 is a longitudinal sectional view of the preferred embodiment of a pneumatic tire pump/regulator constructed in accordance with the present invention which is releasably attachable to a vehicle wheel valve stem.

Turning to FIG. 2, the tire pump/regulator device 10 is arranged in a tangential position located eccentrically of the wheel axis, i.e., orientated outwardly and perpendicularly to a radial line passing through the axis of the wheel viewed from the front of the wheel or oriented tangential with respect to a path of wheel rotation, not shown in FIG. 2 but shown in FIG. 1, as distinguished from a radial position relative to such line. As noted above, the relationship of the valve stem to the rim and wheel follows usual practice, as illustrated generally in the aforementioned U.S. Pat. No. 4,651,792 and is coplanar to a radial line passing through the axis of rotation of the wheel. In the preferred position of the pump two air compression strokes during one revolution are created essentially by the gravitational force at the 90° and 270° positions, as will be more fully explained later. This design is found to have the advantage of providing a two stoke system, and one that produces substantial mechanical leveraging to achieve high output pressures.

Figure 3:
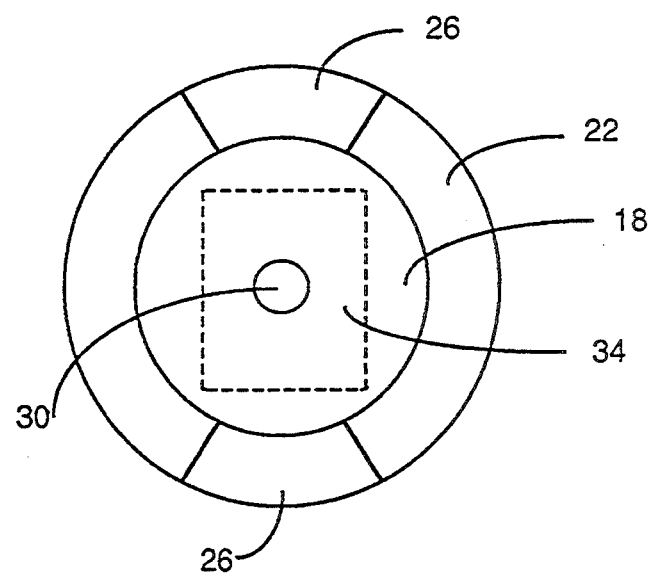
FIG. 3 is a sectional view taken on lines 3—3 of FIG. 2.

In FIGS. 2 and 3 there is illustrated the preferred embodiment of a pneumatic tire pump/regulator apparatus according to the present invention. This particular apparatus will be referred to as a free piston type cycloid pump or piston pump 10. FIG. 2 illustrates a schematic form of the piston pump 10 having a pump body 12 for receiving an oscillating piston body 14, one of its two directions of movements being indicated by arrow 16. On the opposite axial sides of the piston body 14 there are secured to the piston body two identical piston rods 18 and 20 being of substantially smaller diameters than the piston body 14 and hence having a much smaller combined mass in comparison with the piston body 14. The ratio of the mass relative to the area of the ends of the piston rods creates a substantial concentrating working force at the ends of the piston rods.

As noted in FIG. 2, the piston pump is symmetrical about a vertical plane passing through its longitudinal axis. The outer ends of the piston rods are received in cylinders 22 and 24, the inner most ends of which are formed to have two opposed slots 26, shown best in FIG. 3. These slots, when the piston rods pass to the front of the cylinders, allow atmospheric air to enter the cylinders as indicated by the arrows 28 at the right of FIG. 2. At the left of FIG. 2, it will be noted that the outer end of the piston rod which is at its power stoke position, blocks air from entering into the cylinder allowing the air to be compressed in the cylinder. The central piston body 14 is supported by an anti-frictional surface, as indicated in FIG. 2, on the side opposite the axis of the wheel, such as for example by a well known linear bearing 29 having a series of spaced apart cylindrical bearing elements 31 with their axes arranged transverse to the axis of the piston body 14. The bearing, which may engage a flat surface 33 formed on the body, is employed to give stability to the body 14 and piston rods 18 and yet provide for anti-frictional movement thereof and is mounted on the side of the piston body 14 where the centrifugal force is the greatest. Piston to cylinder slide friction is thereby eliminated or minimized.

A less expensive bearing may be utilized, such as an oil impregnated bronze slide bearing.

The cylinders are formed to provide two tandemly arranged separate cylinders 22a and 22b and 24a and 24b. The cylinders 22a and 24a serve as compression cylinders, and both cylinders are communicating with a conventional tire valve stem (not shown) via the cylinders 22b and 24b. The cylinders 22 and 24 are each provided with two in line passageways 30 and 32, the passageways 30 communicating with the cylinders 22a and 22b in one case and with 24a and 24b in the other case, while the passageway 32 communicates with the cylinders 22b and 24b and the valve stem. Between the cylinders 22a and 22b and 24a there are provided well known reed check vanes 34 and 36 located at the back walls of the cylinders 22b and 24b, which allow compressed air from the cylinders 22a and 24a to enter the cylinders 22b and 24b, respectively, and hence to the tire vane but prevent pressure in the cylinders 22b and 24b from passing to the cylinders 24a and 24b, respectively.

The piston 14 may be formed of several well known materials, such as metal or plastics. In the illustrated form, the piston body 12 is made out of a plastic, wherein the center portion 14 is 1 inch in diameter and 1 inch long, whereas the diameter of the end portions 18 and 20 are ¼ inch having a length of ½ inch. The mass ratio between the center portion 14 and the two end portions 18 and 20 is approximately 20:1 for this example. The design illustrated will deliver, for example, a minimum pump output of 1 PSI per hour at 40 miles per hour of vehicle speed.

In the embodiment just described, centrifugal forces are utilized but not primarily relied upon to either position the tangentially arranged piston 14 in its two working stroke positions, i.e. at the 90° and 270° positions of the rotating tire or to effect its operation. Instead, for both the positioning of the piston in its two working stroke positions and in effecting the working strokes, primarily gravity and compression spring effect are harnessed and utilized. In the orbital rotation of the pump 10, the piston body 14 will move with the pump body 12 and since the piston body is free to move relative to the pump body it will continuously reposition itself twice per revolution, i.e., the pump body will be caused to "free fall" from the top of the cylinder 12 to the bottom of the cylinder at the 90° and 270° positions as a result of its tangential location. At the same time air will be alternately admitted to the cylinders 22a or 24a by their associated slots 26 when their piston rods move to the front of the cylinders. During this continuous repositioning, the piston body 14 is not unfavorably subject to the centrifugal force being imposed on the pump body 12. It will be appreciated that during a complete orbital rotation of the pump, the gravitational force on the piston 14 may be considered constant and that the tangential arrangement of the piston allows gravity in the 90° and 270° positions to act in a downward purely vertical direction, thereby to create the two power strokes of the pump.

It is preferred to utilize a pump design, with reference to the volume of air that can be pumped as a result of the gravitational force, that would optimized its output operated at vehicle speeds from 30 to 50 miles per hour, which represent the speeds driven by the average commuting drive. The design can be modified, as will be explained in greater detail hereinafter, to provide optimized outputs at other practical velocity ranges depending on the expected use of the vehicle.

Figure 4:
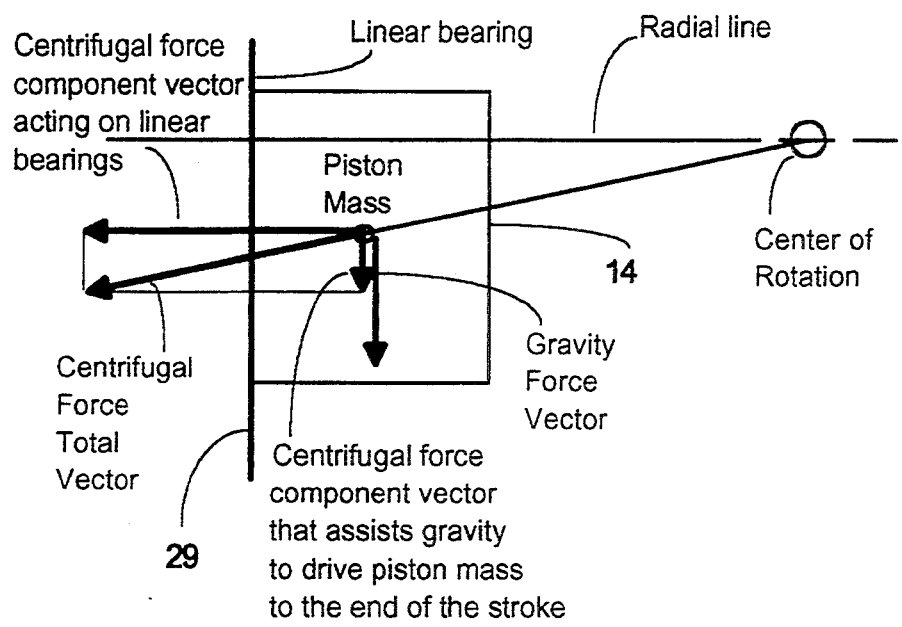
FIG. 4 is a vector diagram illustrating the application of gravitational and centrifugal force components for driving the piston mass of the pneumatic tire pump/regulator of the present invention.
Figure 5:
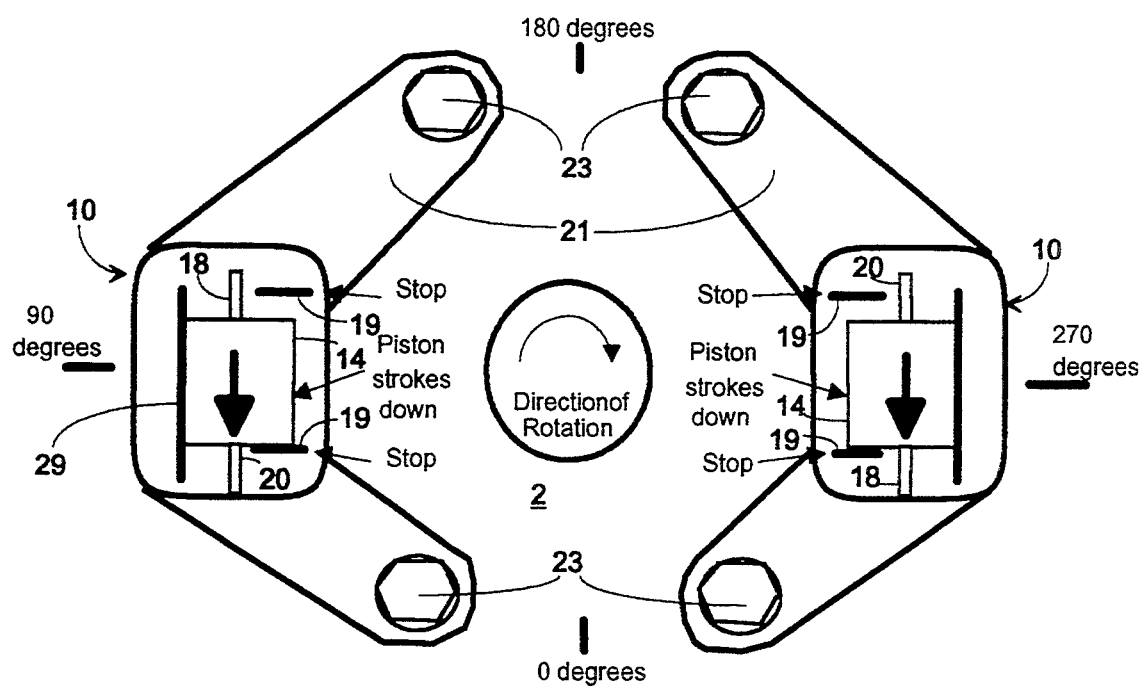
FIG. 5 is a schematic front view of the pneumatic tire pump/regulator illustrated in FIGS. 1 through 3 shown as being mounted in duplicate on a wheel.

With specific reference now to FIGS. 4 and 5, it should be realized that there are a number of dynamic functions that occur during operation of the pump. They vary with each set of pump dimensions and the rotation rate of the vehicle wheel. The design of pump components is recognized or taken into consideration and made use of to produce air pressure for a variety of wheel, vehicle and operating conditions.

The graphical illustration of FIG. 4 pertains in reference to the left hand pump 10 of the pair illustrated in FIG. 5. In FIG. 5, the two pumps 10 are mounted on wheel 2 by brackets 21 which are retained on the wheel by conventional lug nuts 23. The pump 10 is there illustrated as being under clockwise rotation in the 90° position in FIG. 5, and as may be seen in the graphical illustration of FIG. 4, gravity is the principal force that causes the oscillation of the unitary double action free piston 14.

If, for example, 0° of rotation of wheel 2 is attained as illustrated in FIG. 5, such that the wheel is at the six o'clock position as shown with the left hand pump 10 positioned at the 90° position as illustrated in FIGS. 4 and 5, gravity pulls the left hand piston 14 against the direction of wheel rotation downwardly to the 179° position. It may be thus seen with specific reference to FIG. 4 that in addition to this gravitational pull, a small vector of centrifugal force tangential to a radial line passing through the wheel axis, compliments the tangential vector of gravity. The resultant of these two forces drives the piston back and forth on the linear bearings 29, with each end of the pistons 18 and 20 alternately compressing air in the two opposing cylinders 22 and 24.

The length of the stroke of the free piston 14 is restricted by stops 19 at either end of the internal housing 12. The stops 19 allow the double action piston to create a maximum compression ratio for the specific pump application. When there is a significant pressure differential between the tire pressure and the maintenance pressure of the pump, the piston mass strokes over the total allowable range until wheel rotation velocity limits the time within which it can make a full stroke. When the pressure differential between the tire pressure and the maintenance pressure is small, however, the piston mass 14, if allowed to operate without stops, would have an increasing amplitude as vehicle velocity increased because the air columns in both opposing cylinders 22 and 24 act as springs to respectively or alternately urge the piston 14 in the opposite direction. This phenomenon is explained in greater detail hereinafter.

When the piston 14 is hitting the stroke-restricting stops 19, the pressure of the tire is less than the desired value, and the pump is operating. Once the desired pressure is obtained, the piston will not complete a full stroke and pressurized air will no longer pass into the tire. In this regard, note FIG. 6 which illustrates that if the current pneumatic pressure of the tire is below the objective level as indicated in the graph, the total piston stroke length will be maximum as indicated.

The piston in this situation will stroke its maximum length indicated "total piston stroke length" until the stop 19 is engaged. The total piston stroke is made up of the initial compression stroke which raises in pressure exponentially and the output stroke portion which forces air under pressure into the tire in order to work towards the objective tire pressure.

Figure 6:
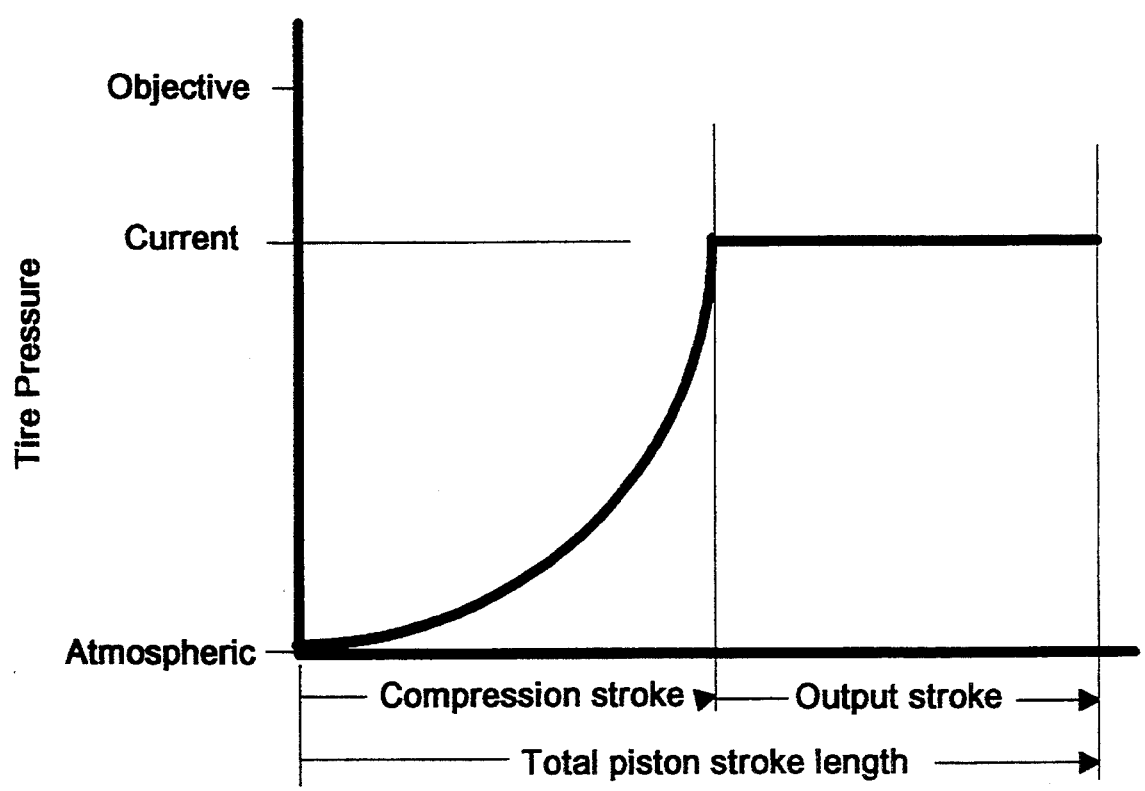
FIG. 6 is a graphical illustration of the cylinder pressure curve of the pneumatic tire pump/regulator of the present invention illustrating tire pressure verses total piston stroke length.

Once the objective tire pressure is obtained, the total piston stroke will be something less than the total piston stroke length indicated on the graph of FIG. 6 and the piston will no longer engage stops 19.

In actuality, in the double action pump of the present invention, as mounted offset from the center of the wheel with its line of reciprocation tangential with respect to a path of wheel rotation, a wheel rotation velocity will be attained and exceeded at which point gravity can no longer provide sufficient effect on the piston to make or effect working strokes of the pump which can be utilized to further inflate the pneumatic tire. In order to cause the pump to effectively function even beyond this limit of wheel rotation velocity, the aforedescribed spring effect of the compressed air columns created in the opposing cylinders is utilized.

When the pressure differential between the objective tire pressure and the current tire pressure is small and wheel rotation velocity increases, the potential amplitude of the piston stroke also increases. This increase is caused by the air columns in the two cylinders acting as springs when they are compressed such that these springs stiffen as wheel rotation velocity increases. The spring effect operates in phase with the piston stroke and amplifies the theoretical stroke length though its actual stroke is restricted by the stops 19 as previously described. This amplification is much greater than what is attainable from the effects of gravity and centrifugal force alone and this increases with increasing vehicle speed.

Eventually and theoretically, a rotation velocity is attained where the spring effects of the air columns cause the piston 14 to resonate. Of course, the physical restrictions of the pump enclosure prevent the piston from achieving this condition. As rotation velocity increases through this resonance point, the air column spring effect goes out of phase with the normal stroke phase of the piston caused by gravity and centrifugal force. The piston mass responds by acting opposite to the gravity and centrifugal force effects due to this spring effect, but still produces useful pressurized air as long as the theoretical stroke length is greater than that allowed by the piston stops. That is, instead of the piston 14 being pulled down by gravity and the centrifugal force vector when the pump is in the first half of its rotation position as illustrated in FIGS. 4 and 5, the air column spring effect overcomes these forces and drives the piston in an opposite or upward direction to thereby provide a useful working stroke for pressurizing the pneumatic tire. It also drives the right hand piston of FIG. 6.

Accordingly, although the piston passes through this phase switch, usable work is still being produced, and compressed air can still be pumped into the tire. Specific pump design considerations can extend this range to higher velocities. However, the theoretical stroke length after the phase switch has occurred, decreases rapidly with increasing vehicle speed. Eventually at higher speeds, the piston stops oscillating and no more compressed air is produced.

However, actual operations are quite different from its theoretical operation. The passage of compressed air through the outlet orifices 30 to the high pressure side 32 of the outlet valves 34 and the leakage of compressed air around the sides of the pistons 18 and 20 cause the air columns to lose spring efficiency. This loss keeps the pump operating in phase to a much higher rotation velocity by shifting the resonance point to a higher wheel rotation velocity. In fact, the piston may never go into resonance because of these inefficiencies.

To view this phenomenon in another way, these or other compression ratio parameters of the pump 10 (such as piston mass, piston stroke length, piston face area, piston blow-by, piston shape, piston friction, cylinder volume, and intake and output orifice size), may be utilized or preselected for tuning the pump whereby this double action piston assembly of the pump is caused to oscillate to effect working strokes due to the gas compression spring effect of the double acting piston-cylinder combination, which respectively and alternately initiates movement of the piston 14 in the opposite direction, even though the wheel upon which the pump is mounted is rotating at velocities in excess of the limit wherein gravity no longer does nor can have any or sufficient effect to provide pump working strokes.

Figure 7:
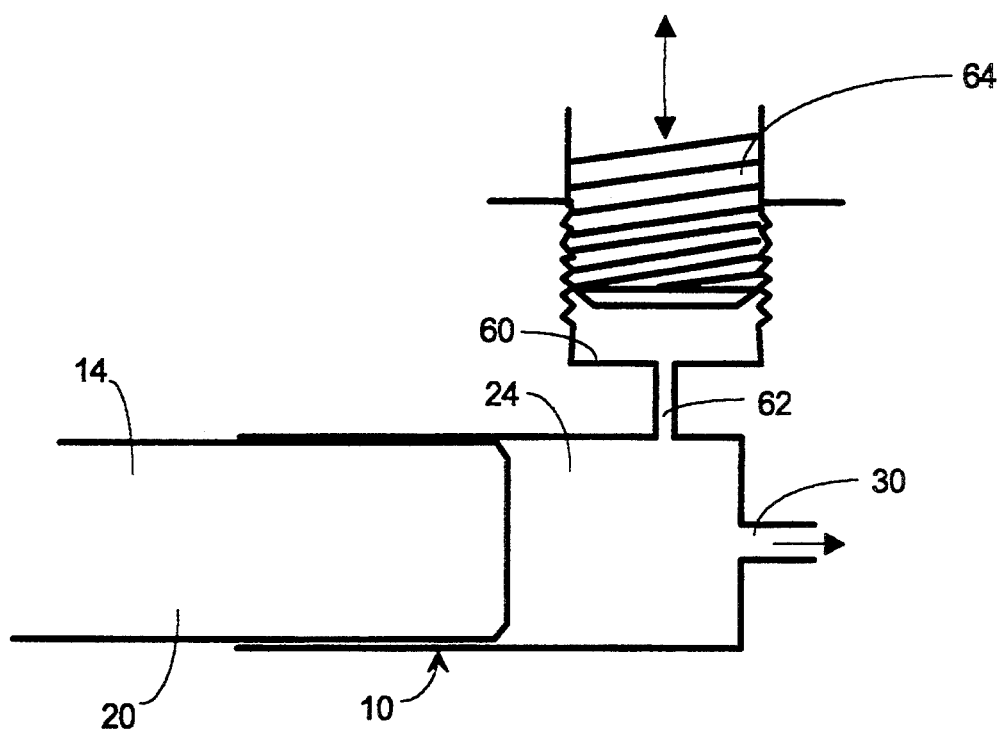
FIG. 7 is a schematic view in vertical section illustrating an additional feature of the pneumatic tire pump/regulator constructed in accordance with the present invention wherein the controlling maintenance pressure is controlled by the compression ratio of the pump.

Turning next to FIG. 7, a unique mechanism is illustrated for controlling tire maintenance pressure of the pump 10. In this mechanism, the maintenance pressure of the tire is controlled by the compression ratio of the pump or piston to cylinder arrangement.

The pressure level device of FIG. 7 includes a residual cylinder volume chamber 60 connected to cylinder 24 via passage 62. Chamber 60 is threadably fitted with adjustable set screw 64 which may be adjustably turned to penetrate into or withdraw from the chamber 60 to thereby accordingly vary the chamber volume. In so doing this also understandably varies or adjusts the compression ration of the pump and in turn thereby also adjusts the air pressure to be maintained in the tire, and additionally also assist in tuning the pump to attain the desired spring effect previously described.

The free piston pump can be made from well known material and incorporate well known elements, as illustrated to some extent in the aforesaid referred to U.S. patents. While in many forms, the apparatus may weigh no more than a few ounces, its size and capacity may be readily determined by those skilled in the art, and will depend on the well known operational parameters and expected use of the associate vehicle. Also in accordance with well known practice a counter weight may be employed if the weight of the pump would create an unbalanced condition for the tire. Moreover, if desired, a valve extension may be provided to allow the input of additional air into the tire from an external tire pump without removing the pump itself.

While the present invention has been described in connection with the preferred embodiments of the various figures, it is to be understood that the other similar embodiments may be used or modifications and additions may be made to the described embodiments for performing the same function of the present invention without deviating therefrom. Therefore, the present invention should not be limited to any single embodiment, but rather construed in breadth and scope in accordance with the recitation of the appended claims.

I claim:

1. Apparatus for pressurizing a pneumatic tire mounted on a wheel, said apparatus comprising:
   a displacement type air pump including an oscillating unitary free piston mass reciprocal along a line by forces occurring with the rotational motion of a wheel for generating air under pressure;
   bearing means for antifrictional support of said piston mass during oscillation thereof within said pump when generating air under pressure;
   mounting means adapted for attaching said pump to a wheel having a pneumatic tire mounted thereon with said line of piston reciprocation positioned offset from center and tangential with respect to a path of wheel rotation; and
   connection means adapted for introducing air under pressure generated from said pump into the pneumatic tire.

2. The apparatus of claim 1 wherein said free piston mass includes a piston reciprocal along said line within a cylinder.

3. The apparatus of claim 2 wherein said piston and cylinder are constructed and arranged so that gravitational force will displace said piston in said cylinder to effect an air pressure working stroke for said pump.

4. The apparatus of claim 3 wherein said pump includes an opposing connected pair of said pistons reciprocal along said line in respective cylinders and thereby providing a double action piston assembly.

5. The apparatus of claim 4 wherein said double action piston assembly includes a central piston member with said opposing pistons operatively connected thereto, said central piston member having a mass substantially greater than both of said opposing pistons.

6. The apparatus of claim 5 wherein compression ratio parameters of said pump are preselected for tuning said pump whereby said double action piston assembly is caused to oscillate to effect working strokes due to gas compression spring effect of the double acting piston-cylinder combination to respectively initiate movement in the opposite direction, at wheel rotation velocities in excess of such velocities where gravity can no longer provide sufficient force for displacing said pistons in said cylinders to effect an air working stroke for said pump.

7. The apparatus of claim 6 including a pneumatic tire mounted on a wheel with said pump operatively secured to said wheel and connected to said tire for pressurization.

8. The apparatus of claim 6 wherein said bearing means is a linear anti-friction bearing supporting a circumferential portion of said central piston member.

9. The apparatus of claim 6 wherein said pump includes means for permitting introduction of air into and discharge of air from the said cylinders, whereby when said piston member is caused by said forces to move in one direction, air is drawn into a first of said two cylinders while simultaneously discharging pressurized air from a second of said to two cylinders for discharge into a pneumatic tire, and when said piston member is caused by said forces to move in a second direction air is drawn into said second cylinder while simultaneously discharging pressurized air from said first cylinder for discharge into a pneumatic tire.

10. The apparatus of claim 6 including pressure level means operably connected to said pump for establishing and maintaining air pressure in the tire at a predetermined level.

11. The apparatus of claim 2, including adjustable compression ratio means adapted for adjusting the compression ratio of said pump to thereby accordingly adjust the air pressure to be maintained in the tire.

12. The apparatus of claim 11, wherein said adjustable compression ratio means includes a residual cylinder volume chamber connected to said cylinder, said chamber having an adjustable set screw threadably protruding into said chamber for varying the volume of said chamber by threadably adjusting said set screw.

13. Apparatus for pressurizing a pneumatic tire mounted on a wheel, said apparatus comprising:
   a positive displacement pump including a housing, a unitary free floating double action piston assembly having a central enlarged piston mass with opposing pistons connected to opposite sides of said mass, said piston assembly reciprocal between stops within said housing along a line with said pistons respectively received within respective opposing cylinders for alternately effecting air pressure working strokes;
   linear bearing means supporting said central piston mass for antifrictional reciprocation in said housing along said line of piston reciprocation;
   mounting means adapted for attaching said pump to a wheel having a pneumatic tire mounted thereon with said line of piston reciprocation positioned offset from the center of the wheel and tangential with respect to a path of wheel rotation so that gravitational force will alternately displace said pistons into said cylinders to effect working strokes for said pump; and
   connection means adapted for introducing air under pressure generated from said pump into the tire.

14. The apparatus of claim 13 wherein compression ratio parameters of said pump are preselected for tuning said pump whereby said double action piston assembly is caused to oscillate to effect working strokes due to the gas compression spring effect of the double acting piston-cylinder combination to respectively initiate movement in the opposite direction, at wheel rotation velocities in excess of such velocities where gravity can no longer provide sufficient force for displacing said pistons in said cylinders to effect an air working stroke for said pump.

15. The apparatus of claim 14, including pressure level means operably connected to said pump for establishing and maintaining air pressure in the tire at a predetermined level.

16. The apparatus of claim 15, wherein said pressure level means includes an adjustable compression ratio device adapted for adjusting the compression ratio of said pump to thereby accordingly adjust the air pressure to be maintained in the tire.

17. The apparatus of claim 16, wherein said adjustable compression ratio device includes residual cylinder volume chambers connected to said cylinders, said chambers having adjustable set screws threadably protruding respectively into said chambers for varying the volume of said chambers by threadably adjusting said set screws.

18. The apparatus of claim 15, wherein said linear bearing means includes spaced rotatable bearing elements.

* * * * *